(12) United States Patent
Engel et al.

(10) Patent No.: US 7,811,035 B2
(45) Date of Patent: Oct. 12, 2010

(54) APPARATUS FOR DEBURRING WITH PLANING TOOLS A METAL STRAND CUT TO LENGTH BY GAS CUTTING

(75) Inventors: Hans-Juergen Engel, Duisburg (DE); Wolfgang Maly, Voeklerbruck (AT)

(73) Assignee: Framag Industrieanlagenbau GmbH, Frankenburg (AT)

( * ) Notice: Subject to any disclaimer, the term of this patent is extended or adjusted under 35 U.S.C. 154(b) by 156 days.

(21) Appl. No.: 12/006,887

(22) Filed: Jan. 7, 2008

(65) Prior Publication Data
US 2008/0170922 A1 Jul. 17, 2008

(30) Foreign Application Priority Data
Jan. 17, 2007 (AT) ................. A 83/2007

(51) Int. Cl.
B23D 1/22 (2006.01)
B23D 1/02 (2006.01)
B23D 79/12 (2006.01)

(52) U.S. Cl. ................. 409/298; 409/310; 409/313; 409/319

(58) Field of Classification Search ................ 409/297, 409/298, 300, 301, 288, 140, 139, 138, 310, 409/313, 319, 316, 157, 158, 159, 172, 258, 409/268, 256; 29/33 A, 33 F; B23C 1/12; B23D 1/22, B23D 1/02, 79/12
See application file for complete search history.

(56) References Cited

U.S. PATENT DOCUMENTS 2,120,316 A 6/1938 Stone
2,587,570 A * 2/1952 Iversen .................... 407/14
2,638,818 A * 5/1953 Stevens ................... 409/298
4,165,625 A * 8/1979 Wagner et al. ............. 72/38
4,362,448 A 12/1982 Hasebe et al.
4,799,300 A * 1/1989 Phillips .................... 29/33 F
4,961,334 A 10/1990 Barnes
5,626,181 A 5/1997 Lotz et al.
6,430,791 B1 * 8/2002 Eckgold ................... 29/56.5

FOREIGN PATENT DOCUMENTS

| DE | 30 37 320 | | 4/1981 |
| DE | 41 19 071 | | 1/1992 |
| DE | 4041539 A1 | * | 7/1992 |
| EP | 0 671 230 | | 9/1995 |
| JP | 58-010422 A | * | 1/1983 |
| JP | 11-010444 A | * | 1/1999 |
| JP | 2002-307229 | | 10/2002 |
| JP | 2004-106072 A | * | 4/2004 |

OTHER PUBLICATIONS

Machine Translation of JP-2004-106072, which JP-2004-106072 was published Apr. 2004.*

* cited by examiner

*Primary Examiner*—Erica E Cadugan
(74) *Attorney, Agent, or Firm*—Collard & Roe, P.C.

(57) ABSTRACT

An apparatus is described for deburring with planing tools a metal strand cut to length by gas cutting, which planing tools are adjustably held each for themselves transversally to the metal strand in a support, and with a drive for the relative advancing movement of the planing tools relative to the metal strand which is cut to length. The annular support includes at least two sets of planing tools which are radially adjustable to the metal strand cut to length, which sets are arranged behind one another in the longitudinal direction of the metal strand cut to length and which are staggered against each other set by set.

4 Claims, 4 Drawing Sheets

APPARATUS FOR DEBURRING WITH PLANING TOOLS A METAL STRAND CUT TO LENGTH BY GAS CUTTING

CROSS REFERENCE TO RELATED APPLICATIONS

Applicant claims priority under 35 U.S.C. §119 of Austrian Application No. A 83/2007 filed Jan. 17, 2007.

FIELD OF THE INVENTION

The invention relates to an apparatus for deburring with planing tools a metal strand cut to length by gas cutting, which planing tools are adjustably held each for themselves transversally to the metal strand in a support, and with a drive for the relative advancing movement of the planing tools relative to the metal strand which is cut to length.

DESCRIPTION OF THE PRIOR ART

When metal strands produced by continuous strand casting are cut to length by gas cutting, a cutting burr is produced on the exit side of the cutting jet which causes a disturbance in further processing the cut metal strands and is therefore removed. It is therefore known for this purpose in the case of plate slabs, i.e. metal strands with a substantially rectangular cross section, (DE 30 37 320 C2) to arrange several planing tools transversally to the longitudinal direction of the plate slabs on a carriage displaceable in the longitudinal direction of the plate slab and to advance each of them to the bottom side of the plate slab having the cutting burr in order to move the carriage by a forward drive after the advancement of the planing tools against the plate slab outside of the cutting burr and to remove said cutting burr according to the advancement of the planing tools by machining. The use of this known apparatus for deburring plate slabs is not suitable for the deburring of billets obtained by the cutting to length of metal strands with a round cross section.

In another known apparatus for deburring a metal strand cut into length by gas cutting (EP 0 671 230 A1), the planing tools are provided on piston bodies which are held in a radially displaceable manner in a common tubular cylinder body and can be pressurized by means of compressed air in order to ensure the advancement of the planing tools against the metal strand under a predetermined force. The feeding of the planing tools occurs via radial displacement of the cylinder body extending parallel to the strand axis. When the planing tools hit the metal strand they are pushed from an initial position limited by a stop into the cylinder body against the pressurization pressure. By adjusting the hollow cylinder body to a circumferential surface of a billet which is round in its cross section, e.g. by a helical progress of the cylinder body relative to the billet axis, it is managed to also deburr billets which have a round cross section, which applies to several adjacent diameter sizes when the individual piston bodies are arranged axially behind each other and offset from one another in the circumferential direction. The disadvantageous aspect is the constructional complexity following the necessary advancement of the cylinder body, especially when it is necessary to provide two cylinder bodies which are opposite of each other with respect to the billet to be deburred. Despite providing two cylinder bodies with piston bodies each carrying a set of planing tools, it is not possible to achieve a machining of the billets which is even over the circumference.

SUMMARY OF THE INVENTION

The invention is thus based on the object of arranging an apparatus for deburring a metal strand cut into length by gas cutting in such a way that advantageous constructional conditions are obtained for the removal of the cutting burr of metal strands of round cross section which are cut to length.

Based on a deburring apparatus of the kind mentioned above, this object is achieved by the invention in such a way that the annular support comprises at least two sets of planing tools which are radially adjustable to the metal strand cut to length, which sets are arranged behind one another in the longitudinal direction of the metal strand cut to length and which are staggered against each other set by set.

The provision of two sets of mutually staggered planing tools which can be adjusted radially relative to the metal strand cut to length offers a simple possibility of fully deburring cut metal strands of different diameter because a cutting sequence of the individual planing tools which closes over the circumference is obtained at different strand diameters through the mutual offset of the planing tool sets which are arranged behind one another in the longitudinal direction of the metal strand in the case of respective overlapping of the mutually offset planing tools. The precondition is an annular support for the planing tools, which support encloses the metal strand to be deburred and which planing tools are each adjustable themselves radially to the cut metal strand relative to the non-displaceable support. The radial tool sets further constitute an advantageous precondition for the complete deburring of the cut metal strand without having any knowledge of the circumferential position of the cutting burr. The planing tools of the tool sets merely need to be distributed over the entire circumference for this purpose.

The advancement for deburring the cut metal strand can also be achieved by displacing the support relative to the stationary held metal strand. Especially advantageous conditions are obtained however when the feeding drive comprises a punch for the cut metal strand which rests on the punch by the annular support, which punch extends in the direction of the metal strand and acts on the face side of the end of the cut metal strand to be deburred. When pressurized in a respective manner, the punch moves the metal strand relative to the planing tools radially pressed against the metal strand under removal of the cutting burr by the annular support. No additional fixing is required for cutting the metal strand that is cut to length and no drive is needed for the support. The table roller which needs to be provided anyway for feeding and removing the metal strands to be deburred can thus advantageously be used as a guide means for the metal strand during the advancing movement by the punch.

When the punch is pressurized by means of an actuating cylinder, said punch can also be used as a braking stop for the metal strands supplied via the table roller, which metal strands are conveyed with their ends to be deburred through the annular support against the punch and are braked by the same, when after applying the planing tools against the respective metal strand outside of its cutting burr the metal strand is subjected to a deburring feed with the help of the stamp against the direction of supply and to eject the same from the apparatus again.

Especially simple constructional conditions are obtained with respect to the arrangement of the planing tools when the support comprises at least two support rings for a set of planing tools each, because in this case the support rings with the planing tools can be arranged with a configuration so as to coincide. It is merely necessary to ensure a respective angular offset of the support rings in order to obtain a ring of planing tools which is closed in the circumferential direction. In the case of two support rings, the angle of offset between the two support rings corresponds to half the angular distance between two adjacent planing tools of a planing tool set in the case of an even distribution of the two support rings. The angle of offset decreases accordingly with the number of support rings.

For the purpose of mutual fixing of the support rings, an axial clamping device can be provided which clamps the support rings on an abutment. When such abutment belongs to a carriage which can be displaced in a frame, the apparatus can be adjusted easily by displacement of the carriage to different diameters of the metal strands conveyed on a stationary table roller. The alignment of the support rings relative to the strand axis which changes in its height with the strand diameter as a result of the stationary strand support does not have to be especially precise due to the individual application of the planing tools.

BRIEF DESCRIPTION OF THE DRAWINGS

The subject matter of the invention is shown in the drawing by way of example, wherein.

DESCRIPTION OF THE PREFERRED EMBODIMENTS

Figure 1:
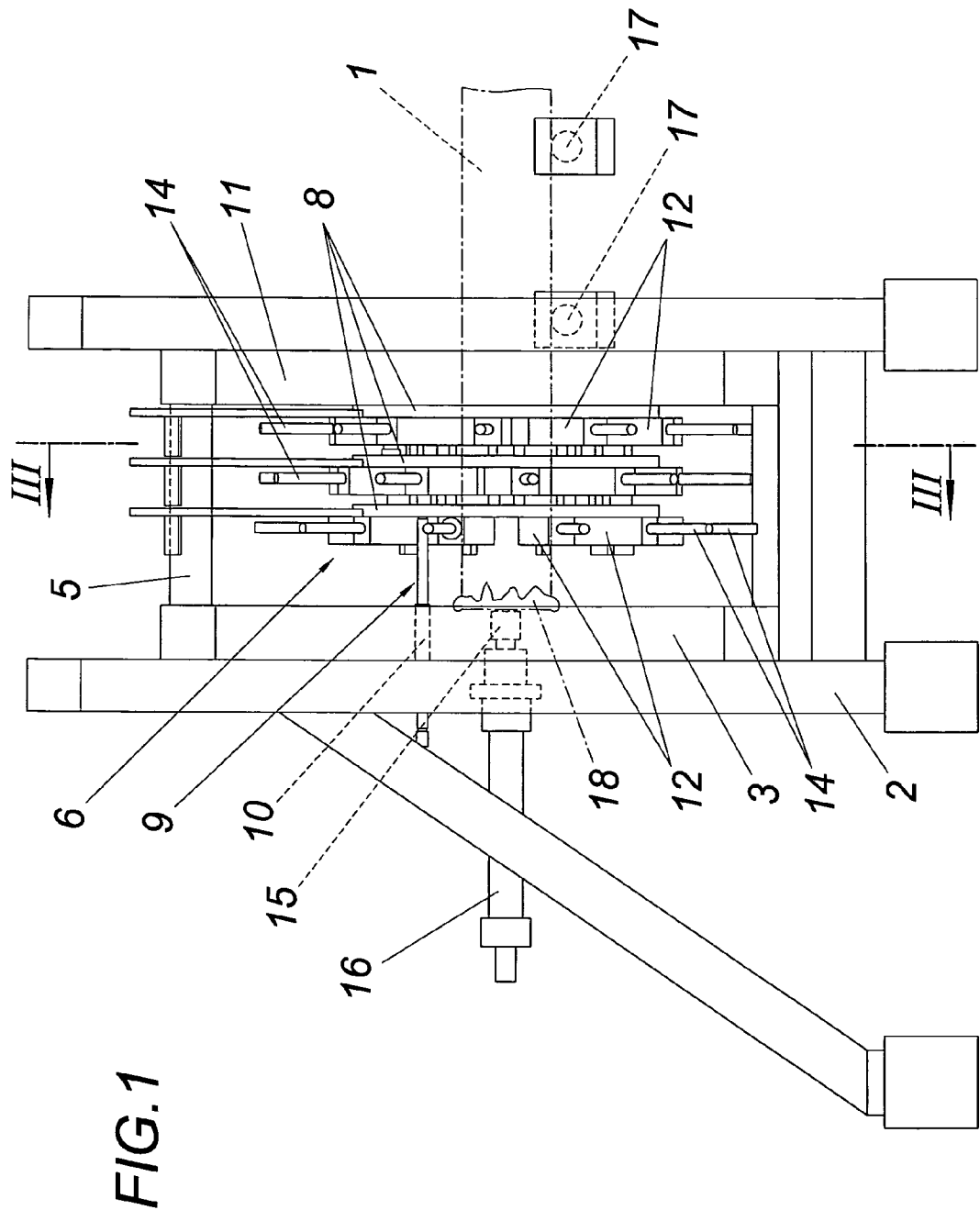
FIG. 1 shows a simplified side view of an apparatus in accordance with the invention for deburring a metal strand cut to length.
Figure 2:
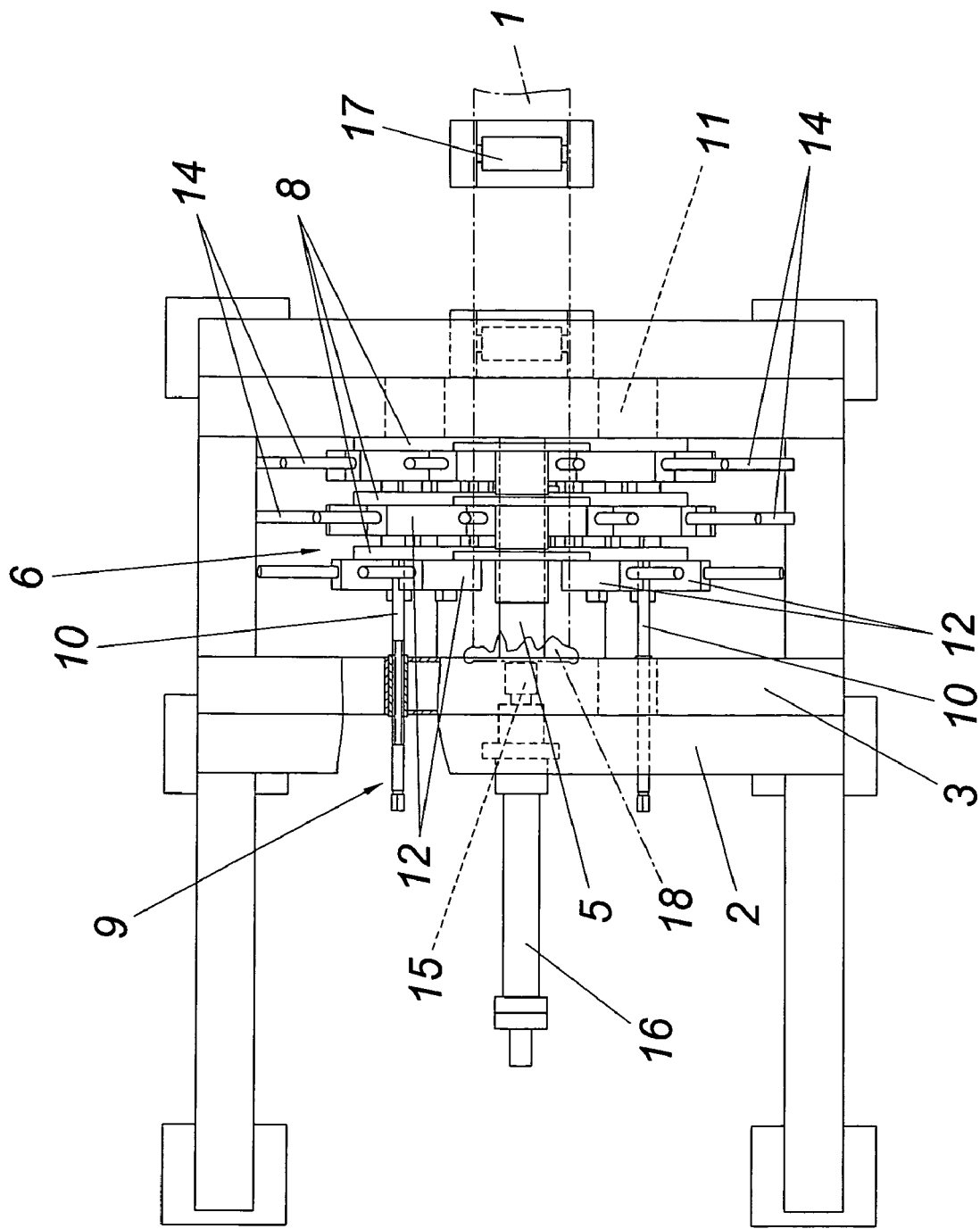
FIG. 2 shows this apparatus in a partly sectional top view.
Figure 3:
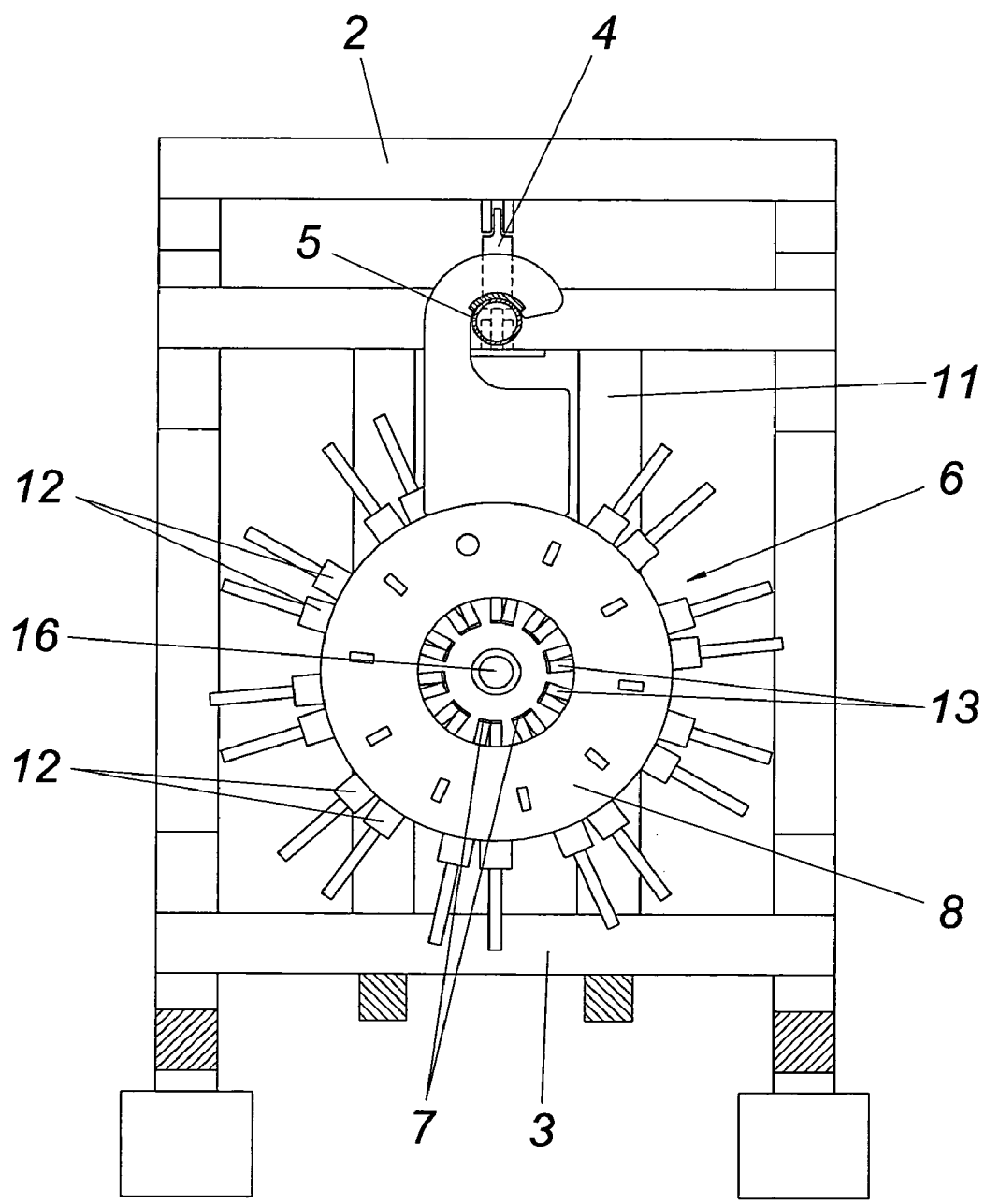
FIG. 3 shows a sectional view along the line III-III of FIG. 1.
Figure 4:
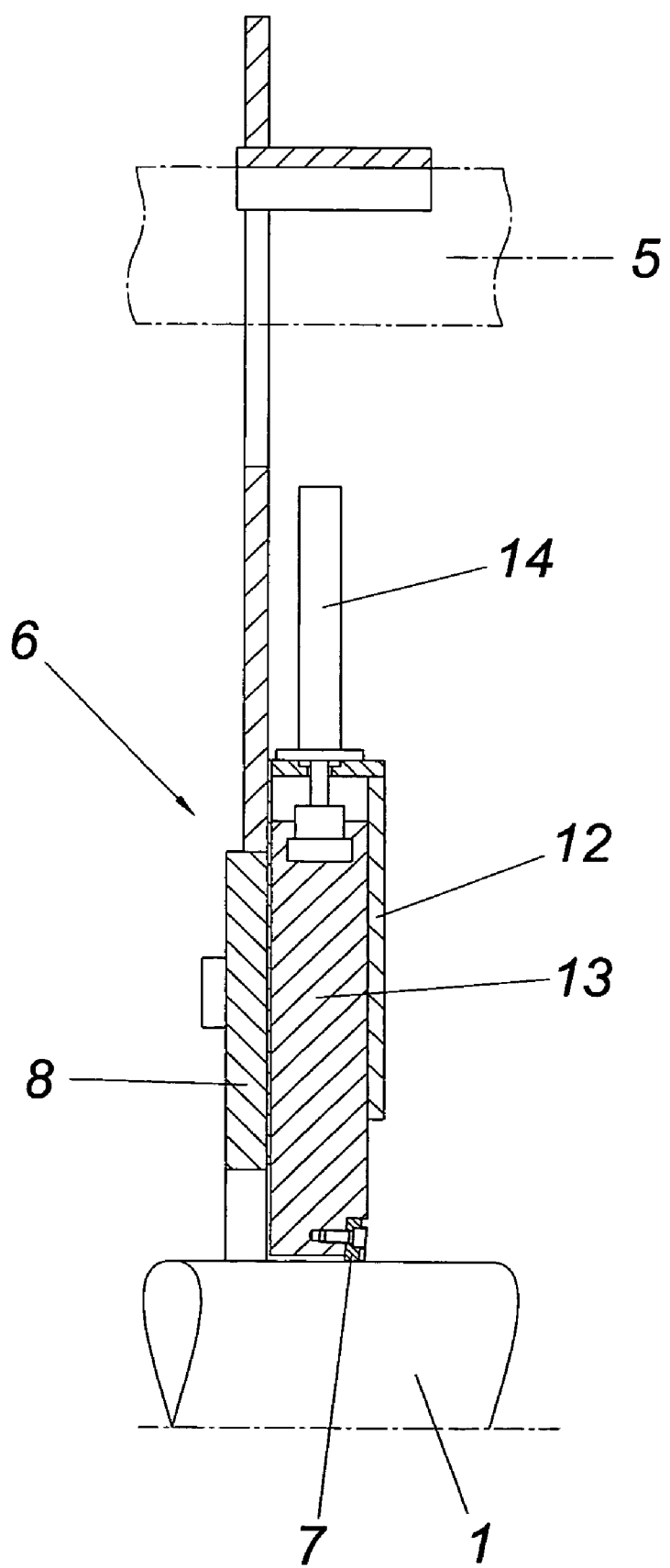
FIG. 4 shows a support ring in a sectional view in the area of a planing tool in an axial sectional view on an enlarged scale.

The illustrated apparatus for deburring a metal strand 1 which is cut to length by gas cutting comprises a frame 2 in which a carriage 3 can be displaced with respect to height by means of lifting cylinders 4. Carriage 3 forms a support tube 5 on which a support 6 for planing tools 7 is suspended. Said support 6 is composed in the illustrated embodiment from three support rings 8 which are arranged in the longitudinal direction of the cut metal strand 1 behind one another and can be fixedly clamped in the axial direction on an abutment 11 of carriage 3 by means of a clamping device 9 in the form of screw drives 10 for example. The support rings 8 which can each be suspended themselves on the support tube 5 are provided with radial guide means 12 for the planing tools 7, which guide means are distributed evenly over the circumference and whose carriers 13 which are displaceably held in the guide means 12 can be displaced by means of actuating drives 14 for advancing the planing tools 7 to the metal strand 1 to be machined, e.g. with the help of actuating cylinders. The arrangement is made in such a way that the support rings 8 which are arranged so as to coincide are arranged in a mutually angularly offset manner, so that a staggered configuration is obtained for the sets of planing tools which are associated with each support ring 8, thus producing a ring of planing tools 7 which is closed over the circumference. Since three support rings 8 are provided in the embodiment, this means that the individual support rings 8 need to be offset from each other by an angle which corresponds to one-third of the angular distance of two adjacent planing tools 7 of a support ring 8.

In addition to the support 6 for the radially adjustable planing tools 7, the carriage 3 also carries a punch 15 which impinges upon the face side of the metal strand 1 and which can be pressurized by the actuating cylinder 16. The association is chosen in such a way that the punch 15 which extends coaxially to the support rings 8 is displaced with the help of the actuating cylinder 16 through the support rings 8 in order to subject the metal strand 1 resting on the face side of the punch 15 on a table roller to a respective advancing movement for deburring.

In order to debur a cut metal strand 1 in the form of a billet with round cross section, the metal strand 1 is brought forward via the table roller 17, with an adjustment of the apparatus to the respective diameter of the metal strand 1 being made by means of a height displacement of the carriage 3.

The punch 15 which is coaxial to the support 6 is aligned at least approximately to the strand axis. The punch 15 which is advanced via the actuating cylinder 16 against the arriving metal strand 1 can also be used advantageously as a brake stop in order to thus brake the metal strand 1 in such a way that the end 18 to be deburred which impinges upon the punch 15 protrudes from the annular support 6, as is shown in the drawing. In this position of the metal strand 1, the planing tools 7 are situated axially outside of the cutting burr area to be removed. The respective contour of the metal strand 1 is detected and copied with the radial advancement of the planing tools 7 via the actuating cylinders 14, so that deburring can occur in accordance with this contour—For this purpose, the actuating cylinder 16 for the punch 15 is pressurized as an advancing drive with the consequence the metal strand 1 is pushed out of the apparatus by punch 15 opposite of the incoming direction, with the cutting burr being removed to an extent which corresponds to the excess portion determined by the application of the planing tools 7.

The invention claimed is:

1. An apparatus for deburring with planing tools a metal strand cut to length by gas cutting, the metal strand comprising a billet having a cross section with a periphery, said planing tools being adjustably held each for themselves transversally to the metal strand in an annular support, and with an advancing drive for relative advancing movement of the planing tools relative to the metal strand which is cut to length, wherein the advancing drive comprises a punch for the cut metal strand, the cut metal strand impinging on the punch by the annular support, said punch extending toward the metal strand and acting on a face side of an end of the cut metal strand to be deburred, wherein the annular support comprises at least two sets of planing tools which are radially adjustable relative to a diameter of the metal strand cut to length, which sets are arranged behind one another in a longitudinal direction of the metal strand cut to length and which are angularly staggered against each other about the longitudinal direction, set by set, to enable the planing tools to engage the whole periphery.

2. The apparatus according to claim 1, further comprising an actuating cylinder, wherein the punch can be pressurized using the actuating cylinder and forms a brake stop for the cut metal strand.

3. The apparatus according to claim 1, wherein the annular support comprises at least two support rings, each for one of the sets of planing tools.

4. The apparatus according to claim 3, further comprising a frame, a carriage height-adjustable in the frame, said carriage having an abutment, and an axial clamping device, wherein the at least two support rings can be clamped to the abutment of the carriage in an axial direction of the cut metal strand using the axial clamping device.

* * * * *